(12) United States Patent
Duran et al.

(10) Patent No.: US 10,931,759 B2
(45) Date of Patent: Feb. 23, 2021

(54) METHODS AND SYSTEMS FOR ESTABLISHING A MODERATED COMMUNICATION CHANNEL

(71) Applicant: MOTOROLA SOLUTIONS, INC., Chicago, IL (US)

(72) Inventors: James C. Duran, Palatine, IL (US); Sa'ed A'Rafat, Carol Stream, IL (US); Kang Bum Lee, Des Plaines, IL (US); Shwetal S. Parikh, Palatine, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 273 days.

(21) Appl. No.: 16/110,459

(22) Filed: Aug. 23, 2018

(65) Prior Publication Data
US 2020/0068025 A1 Feb. 27, 2020

(51) Int. Cl.
*H04M 3/51* (2006.01)
*H04W 4/02* (2018.01)
(Continued)

(52) U.S. Cl.
CPC ............ *H04L 67/141* (2013.01); *H04L 63/10* (2013.01); *H04M 3/5116* (2013.01); *H04M 2242/04* (2013.01)

(58) Field of Classification Search
CPC ............... H04M 3/5116; H04M 3/523; H04M 2242/04; H04W 4/023; H04W 4/90
See application file for complete search history.

(56) References Cited

U.S. PATENT DOCUMENTS 6,118,866 A 9/2000 Shtivelman
6,370,234 B1 4/2002 Kroll
(Continued)

FOREIGN PATENT DOCUMENTS

WO 2017/035810 A1 3/2017
WO 2018/034584 A1 2/2018
(Continued)

OTHER PUBLICATIONS

International Search Report and Written Opinion dated Nov. 8, 2019 for related International Application No. PCT/US2019/047311 (13 pages).

*Primary Examiner* — Scott M Sciacca
(74) *Attorney, Agent, or Firm* — Michael Best and Friedrich LLP

(57) ABSTRACT

Methods and systems for establishing a moderated communication channel. One system includes an electronic computing device including a network interface configured to receive and transmit communications between a communication device and a plurality of network-connectable devices. The electronic computing device further includes an electronic processor configured to establish a first communication channel between the communication device and a first network-connectable device over which the electronic computing device receives a first data feed relating to a public safety incident from the first network-connectable device. The electronic processor is further configured to receive and queue a second data feed from a second network-connectable device. The electronic processor is further configured to determine that the second data feed relates to the public safety incident, and in response to this determination, establish a moderated communication channel between the communication device, the first network-con- (Continued)

nectable device, and the second network-connectable device.

18 Claims, 6 Drawing Sheets

(51) Int. Cl.
  *H04W 4/08* (2009.01)
  *H04W 76/00* (2018.01)
  *H04L 29/08* (2006.01)
  *H04L 29/06* (2006.01)

(56) References Cited

U.S. PATENT DOCUMENTS

| | | | |
|---|---|---|---|
| 7,933,621 B1* | 4/2011 | Vu | H04W 8/186 455/518 |
| 8,838,061 B2 | 9/2014 | Keller et al. | |
| 8,976,939 B1 | 3/2015 | Hamilton et al. | |
| 2010/0246781 A1 | 9/2010 | Bradbum | |
| 2012/0320912 A1 | 12/2012 | Estrada et al. | |
| 2014/0038668 A1* | 2/2014 | Vasavada | H04M 11/04 455/556.1 |
| 2014/0143004 A1* | 5/2014 | Abhyanker | H04L 12/1859 705/7.19 |
| 2016/0295016 A1* | 10/2016 | Fletcher | H04M 3/5116 |
| 2018/0053401 A1* | 2/2018 | Martin | G08B 29/188 |
| 2018/0146169 A1* | 5/2018 | Siminoff | G06F 40/40 |
| 2018/0151039 A1* | 5/2018 | Lemberger | G08B 13/19663 |
| 2018/0184236 A1* | 6/2018 | Faraone | H04W 64/00 |
| 2018/0365785 A1* | 12/2018 | Boss | G06Q 10/063112 |

FOREIGN PATENT DOCUMENTS

| | | |
|---|---|---|
| WO | 2018/124895 A1 | 7/2018 |
| WO | 2019/117735 A1 | 6/2019 |

* cited by examiner

US 10,931,759 B2

METHODS AND SYSTEMS FOR ESTABLISHING A MODERATED COMMUNICATION CHANNEL

BACKGROUND OF THE INVENTION

The use of devices such as tablets, laptop computers, desktop computers, telephones (for example, cellular, landline, or satellite), devices with an interactive display, other communication devices, and combinations thereof has become prevalent. These devices provide users with instant access to increasingly valuable information, resources, and databases. When used in a public safety context and depending on access authorization, a user might access such information as vehicle histories, arrest records, outstanding warrants, health information, real-time traffic or other situational status information, and the like. This type of information may aid the user in making informed decisions, for example, of next action to take or how to resolve a situation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
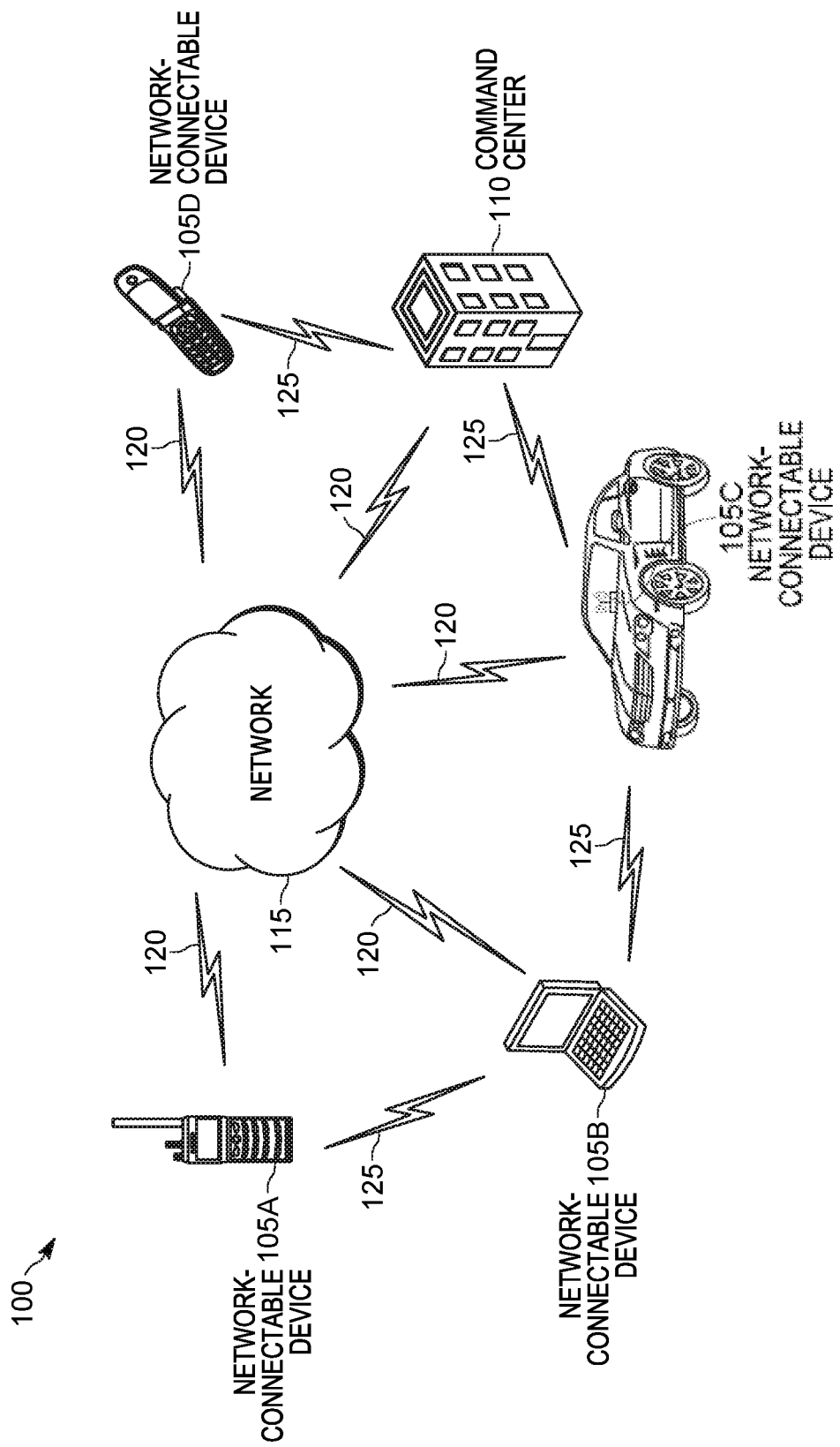
FIG. 1 is a block diagram of a communication system according to one example embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One or more devices such as tablets, laptop computers, desktop computers, telephones (for example, cellular, landline, or satellite), devices with an interactive display, and other communication devices may be a part of a dispatch console operated by a dispatcher such as a public safety dispatcher. In some embodiments, the dispatch console of a dispatcher presents one or more received data feeds to the dispatcher via an output device. For example, content of a voice call is presented audibly via a speaker of the dispatch console. In other words, the dispatch console allows the dispatcher to participate in voice calls with a citizen or an officer. However, in some situations, the dispatch console may only allow the dispatcher to participate in a voice call with one other device at a time. This situation may be problematic when multiple callers are calling about the same incident, but the calls are queued due to lack of availability of dispatchers. For example, a second caller whose call is placed in a queue may be able to provide more reliable and/or more relevant information to the dispatcher about the incident but is unable to do so because the dispatcher is unavailable while participating in a voice call with a first caller. Along similar lines, when the second caller is able to communicate with a second dispatcher who becomes available, the second dispatcher does not have the information provided by the first caller because the second dispatcher did not communicate with the first caller. Additionally, in general, information reported by callers may be inaccurate and/or unverified. Furthermore, there may be privacy concerns regarding sharing of private information when multiple callers are able to hear each other when engaging in group communication. Thus, there is a technological problem with respect to the communication between a dispatcher and people reporting incident information to the dispatcher.

Disclosed are, among other things, a method, device, and system for one or more electronic processors to establish a moderated communication channel between a communication device of a dispatcher (for example, a dispatch console) and a plurality of network-connectable devices of callers (for example, smart telephones, tablets, portable radios, and the like). In some embodiments, the one or more electronic processors establish the moderated communication channel in response to determining that an additional data feed from a network-connectable device (for example, a second voice call from a second caller) relates to a public safety incident about which information is being provided via a first data feed (for example, a first voice call already in progress between a dispatcher and a first caller). In some embodiments, before establishing the moderated communication channel, the one or more electronic processors obtain permission from the first caller and the second caller to communicate over the moderated communication channel. In some embodiments, the one or more electronic processors identify private information received from a device of one of the first caller and the second caller over the moderated communication channel and prevent the device of the other of the first caller and the second caller from receiving the private information.

Certain examples of the disclosed method, device, and system solve the above-noted technological problem by improving communication between a dispatcher and people reporting incident information to the dispatcher by determining that multiple callers are calling to provide information about the same incident and establishing a moderated communication channel between the dispatcher and such callers. For example, using the moderated communication channel, the dispatcher is able to obtain information about the incident from multiple callers without engaging in separate calls. In some situations, one caller may be able to correct an error in information provided by another caller or provide additional information based on information provided by another caller. For example, when a first caller states that a thief was wearing a red shirt, another caller may be able to correct the statement by stating that the shirt of the thief was actually brown. As another example, another caller may be able to provide the name of the thief or provide the make and model of a getaway vehicle used by the thief. Additionally, the disclosed method, device, and system may reduce the size of a queue of callers contacting a public safety agency by more quickly identifying an incident associated with each call and placing calls in the appropriate moderated communication channel of a dispatcher that is handling the incident. Furthermore, due to privacy permissions and settings as mentioned above and described in detail below, the disclosed method, device, and system prevent private information of callers from being provided to other callers over the moderated communication channel. Thus, the disclosed method, device, and system improve the speed and accuracy at which a dispatcher may receive incident information from callers while maintaining a level of privacy between the callers.

The dispatch console may be operated by a public safety dispatcher. In some situations, a public safety command center includes one or more dispatch consoles each operated by a different dispatcher. In some situations, the dispatchers include emergency call-takers and incident-handling dispatchers. In some embodiments, an emergency call-taker is a person who analyzes a received data feed from a citizen via an emergency call-taker device (for example, voice call, live or recorded video feed, text message, and the like), identifies an incident based on the data feed, and decides how to respond to the data feed to help the citizen and handle the incident. For example, the emergency call-taker may transfer the data feed to a different agency (for example, animal control), take no action (for example, when the data feed is a prank call or an accidental call), transfer the data feed to the dispatch console of an incident-handling dispatcher, and the like.

In some situations, a dispatch console of an incident-handling dispatcher receives one or more data feeds from citizens in response to an emergency call-taker using an emergency call-taking device to transfer the one or more data feeds to the dispatch console of the incident-handling dispatcher. In some situations, the incident-handling dispatcher is temporarily assigned to an incident in which officers are supervising, maintaining, providing assistance, and the like (for example, a concert, a sporting event, management of a theme park or other entertainment venue, and the like). In some embodiments, the incident is an event, occurrence, or situation in which officers are involved. In some embodiments, the incident is a public safety incident in which public safety officers are called to a location to provide assistance in resolving or preventing a societal or environmental problem (for example, a location where a suspect is committing or has committed a crime, a fire, a vehicular accident, a traffic stop, and the like).

In some embodiments, the dispatch console of the incident-handling dispatcher additionally or alternatively receives one or more data feeds from devices of officers handling the incident. In some embodiments, officers are personnel acting on behalf of a dispatching, supervising, or responsible agency/entity (for example, employees of a theme park; security guards at a concert or sporting event; public safety officers such as police officers, firefighters, and paramedics; and the like). As an example of the dispatch console receiving data feeds from devices of officers, the dispatch console of the incident-handling dispatcher receives an audio feed (for example, a voice call) from a portable radio. As another example, the dispatch console receives a video feed or an image feed from one or more of a camera of a network-connectable device such as a smart telephone, a dash camera of a vehicle, and a body-worn camera of an officer. As another example, the dispatch console of the incident-handling dispatcher receives a data feed from a biometric sensor that monitors biometric data of an officer. In some embodiments, the dispatch console receives a data feed from a device that is not operated by a citizen or an officer such as one or more of a security camera, a traffic camera, an alarm notification system that monitors one or more of a building, a park, a fence, a parking lot, and other geographical locations (for example, a fire alarm, a toxic gas alarm, and the like) and the like.

One embodiment provides an electronic computing device including a network interface configured to receive and transmit communications between a communication device and a plurality of network-connectable devices. The electronic computing device further includes an electronic processor configured to establish a first communication channel between the communication device and a first network-connectable device. The electronic computing device is configured to receive a first data feed relating to a public safety incident from the first network-connectable device. The electronic processor is further configured to receive and queue a second data feed from a second network-connectable device. The electronic processor is further configured to determine that the second data feed from the second network-connectable device relates to the public safety incident. The electronic processor is further configured to establish a moderated communication channel between the communication device, the first network-connectable device, and the second network-connectable device in response to determining that the second data feed from the second network-connectable device relates to the public safety incident.

Another embodiment provides a method of establishing a moderated communication channel. The method includes establishing, with an electronic processor of an electronic computing device, a first communication channel between a communication device and a first network-connectable device. The method further includes receiving, from the first network-connectable device over the first communication channel, a first data feed relating to a public safety incident. The method further includes receiving and queuing, with the electronic processor, a second data feed from a second network-connectable device. The method further includes determining, with the electronic processor, that the second data feed from the second network-connectable device relates to the public safety incident. The method further includes establishing, with the electronic processor, the moderated communication channel between the communication device, the first network-connectable device, and the second network-connectable device in response to determining that the second data feed from the second network-connectable device relates to the public safety incident.

Another embodiment provides an electronic computing device including a network interface configured to receive and transmit communications between a communication device and a plurality of network-connectable devices. The electronic computing device further includes an electronic processor configured to establish a first communication channel between the communication device and a first network-connectable device. The electronic computing device is configured to receive a first data feed relating to a public safety incident from the first network-connectable device. The electronic processor is further configured to receive and queue a second data feed from a second network-connectable device. The electronic processor is further configured to provide an automated questionnaire to the second network-connectable device, and receive information in response to providing the automated questionnaire. The electronic processor is further configured to compare the received information to information related to the public safety incident. The electronic processor is further configured to determine that the second data feed from the second network-connectable device relates to the public safety incident in response to identifying at least one common data element of the received information and the information related to the public safety incident based on comparing the received information to the information related to the public safety incident. The common data element is at least one of common location data, common keyword data, common biometric data, and common profile data. The electronic processor is further configured to receive an input indicating that permission for the second network-connectable device to communicate over a moderated communication channel has been granted. The electronic processor is further configured to establish the moderated communication channel between the communication device, the first network-connectable device, and the second network-connectable device in response to determining that the second data feed from the second network-connectable device relates to the public safety incident and in response to receiving the input indicating that permission for the second network-connectable device to communicate over the moderated communication channel has been granted.

FIG. 1 is a block diagram of a communication system 100 according to one example embodiment. The communication system 100 includes various network-connectable devices 105A through 105D. In the following description, when explaining how a single network-connectable device functions, a reference to network-connectable device 105 is used. As indicated by FIG. 1, the network-connectable device 105 may be any one of a number of different types of network-connectable devices. For example, network-connectable device 105A is a portable communication device carried by an officer during patrol (for example, an employee of a theme park; a security guard at a concert or sporting event; a public safety officer such as police officer, firefighter, and paramedic; and the like). In some embodiments, network-connectable device 105A is a smart phone, a battery powered portable radio, a body wearable camera, a biometric sensor, or similar device. As another example, network-connectable device 105B is a laptop computer that can receive input from a user via a keyboard, a touchscreen display, a microphone (for example, voice commands), and the like. In other embodiments, network-connectable device 105B is a tablet, a desktop computer, or a similar device. As another example, network-connectable device 105C is a vehicular mobile communication device (for example, a device built into a police vehicle, a fire truck, an ambulance, a maintenance vehicle such as a tow truck, and the like). Network-connectable device 105C may include, but is not limited to, a dashboard camera, a microphone, a laptop, and the like. As yet another example, network-connectable device 105D is a smart phone operated by a civilian. Network-connectable device 105D may be any type of network-connectable device (for example, a laptop, desktop computer, tablet, smart watch, and the like).

The types of network-connectable devices 105A through 105D described above and shown in FIG. 1 are merely examples. In other embodiments, the communication system 100 includes other types of network-connectable devices. For example, a network-connectable device 105 is an alarm system that monitors a building (for example, a fire alarm, a toxic gas alarm, and the like). In some embodiments, one or more network-connectable devices 105 are not operated by a citizen or an officer such as one or more of a security camera, a traffic camera, and the like. In some embodiments, the communication system 100 includes more or fewer network-connectable devices 105 than the quantity of network-connectable devices 105 shown in FIG. 1.

As shown in FIG. 1, the communication system 100 also includes a command center 110. For example, the command center 110 is a security management office at a theme park or a public safety command center such as a police headquarters, fire station, dispatch center, public safety answering point (PSAP), operations center, command and control facility, and the like. In some embodiments, the command center 110 includes one or more network-connectable devices 105 that are part of the communication system 100 as explained below with respect to FIG. 2. In the following description, when explaining communication to or from the command center 110, it should be understood that such communication is occurring to or from one or more of the network-connectable devices 105 included in the command center 110.

As indicated in FIG. 1, the network-connectable devices 105A through 105D and the command center 110 may communicate with each other over a network 115 over respective wireless links 120 and via corresponding network interfaces including one or more transceiver circuits (for example, by sending and receiving radio signals). The network 115 may include wireless and wired portions. All or parts of the network 115 may be implemented using various existing networks, for example, a cellular network, the Internet, a land mobile radio (LMR) network, a Bluetooth™ network, a wireless local area network (for example, Wi-Fi), a wireless accessory Personal Area Network (PAN), a Machine-to-machine (M2M) autonomous network, and a public switched telephone network. The network 115 may also include future developed networks. In some embodiments, the network 115 may also include a combination of the networks mentioned.

Also as shown in FIG. 1, in some embodiments, the network-connectable devices 105A through 105D and the command center 110 may communicate directly with each other via direct-mode wireless link(s) 125 using a communication channel or connection that is outside of the network 115. For example, the network-connectable devices 105A through 105D and the command center 110 communicate directly with each other when they are within a predetermined distance from each other. Although FIG. 1 only shows direct-mode wireless links 125 between adjacent network-connectable devices 105, in some embodiments, any one of the network-connectable devices 105 and the command center 110 is capable of communicating with another network-connectable device 105 or the command center 110 via a direct-mode wireless link 125.

Figure 2:
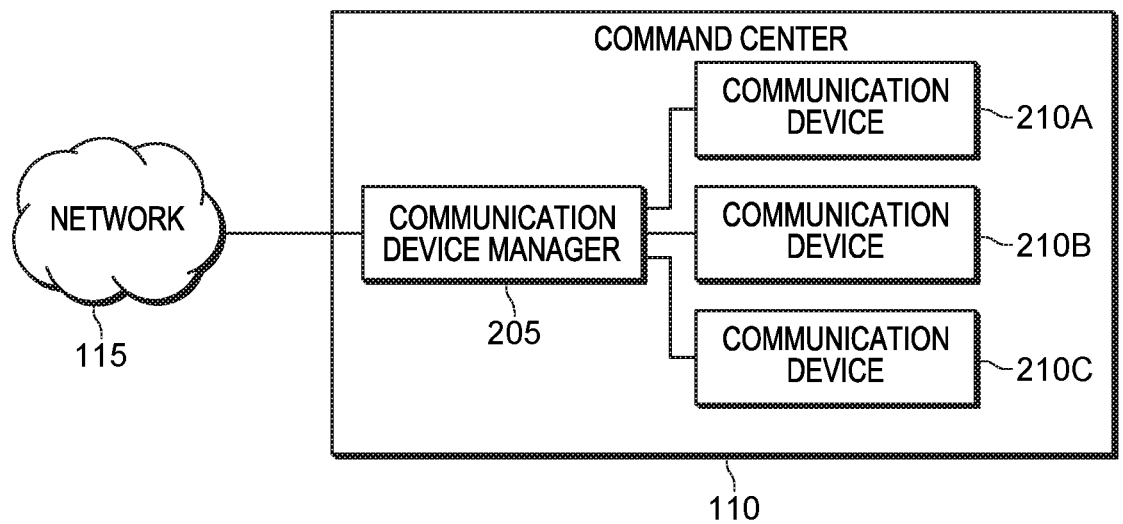
FIG. 2 is a block diagram of a command center included in the communication system of FIG. 1 according to one example embodiment.

FIG. 2 is a block diagram of the command center 110 according to one example embodiment. In some embodiments, the command center 110 includes a communication device manager 205 and a plurality of communication devices 210A through 210C that are similar to and may be considered network-connectable devices 105 of FIG. 1 as explained above. In the following description, when explaining how a single communication device functions, a reference to communication device 210 is used. In some embodiments, the communication devices 210 are dispatch consoles that are each operated by a separate dispatcher (for example, public safety dispatch consoles each operated by a separate incident-handling dispatcher as explained above). In some embodiments, the communication device manager 205 is communicatively coupled to the network 115 and to the communication devices 210A through 210C via wired connections, wireless connections, or a combination thereof. As explained in greater detail below, the communication device manager 205 is configured to receive one or more data feeds from one or more network-connectable devices 105 over the network 115. In some embodiments, the communication device manager 205 is configured to control which received data feeds are provided to which communication devices 210. In some embodiments, the communication devices 210 are configured to communicate through the communication device manager 205 to one or more network-connectable devices 105 over the network 115.

Although the communication devices 210 are described as being located at the command center 110, in some embodiments, the communication devices 210 are portable devices such as the network-connectable devices 105 described above. Additionally, the terms "network-connectable device" and "communication device" are used throughout this specification to explain example use situations. However, a single device, for example, a portable radio of a public safety officer, may be considered a network-connectable device 105 in one situation and may be considered a communication device 210 in another situation.

In some embodiments, the command center 110 includes additional communication devices operated by emergency call-takers that receive one data feed at a time from a queue of data feeds intended for the command center 110. For example, the emergency call-takers are 911 call-takers operating 911 call-taking devices that receive data feeds from citizens who enter 9-1-1 on their network-connectable device 105 to transmit a data feed to the command center 110. In such embodiments, these additional communication devices operated by emergency call-takers may be integrated into the communication device manager 205 or may be communicatively coupled to the communication device manager 205. Similarly, while FIG. 2 shows the communication devices 210 and the communication device manager 205 as separate devices, in some embodiments, the communication devices 210 are integrated into the communication device manager 205 and directly controlled by the communication device manager 205. In other embodiments, the command center 110 may not include a separate communication device manager 205 and the functionality of the communication device manager 205 described below may be integrated into each of the communication devices 210. In some embodiments, the command center 110 includes more or fewer communication devices 210 than the quantity of communication devices 210 shown in FIG. 2.

In some embodiments, the communication device manager 205 maintains a queue of data feeds received from network-connectable devices 105 that are intended for the command center 110. For example, when all dispatchers (for example, emergency call-takers and incident-handling dispatchers) are currently handling other data feeds (for example, other voice calls), the communication device manager 205 queues later-received data feeds in the order that they are received. When a dispatcher becomes available, the communication device manager 205 routes a data feed in the queue to the newly-available dispatcher. In some embodiments, the communication device manager 205 obtains information from one or more data feeds in the queue. For example, a data feed in the queue includes metadata that indicates a location from where the data feed was received, a time stamp at which the data feed was captured or transmitted, an identifier that identifies a user of the network-connectable device 105 that transmitted the data feed, and the like. As another example, when the data feed is a text feed (for example, a text message) or a biometric sensor data feed, the communication device manager 205 analyzes the data feed while the data feed is in the queue. As another example, the communication device manager 205 provides an automated questionnaire to a network-connectable device 105 providing a data feed (for example, a voice call) that is waiting in the queue as explained in further detail below. In response to the automated questionnaire, the communication device manager 205 receives information about the queued data feed from a user of the network-connectable device 105 providing the queued data feed. In some embodiments, the communication device manager 205 determines additional information from the received information from the user of the queued network-connectable device 105 as explained in greater detail below (for example, incident type information based on keyword data).

Figure 3:
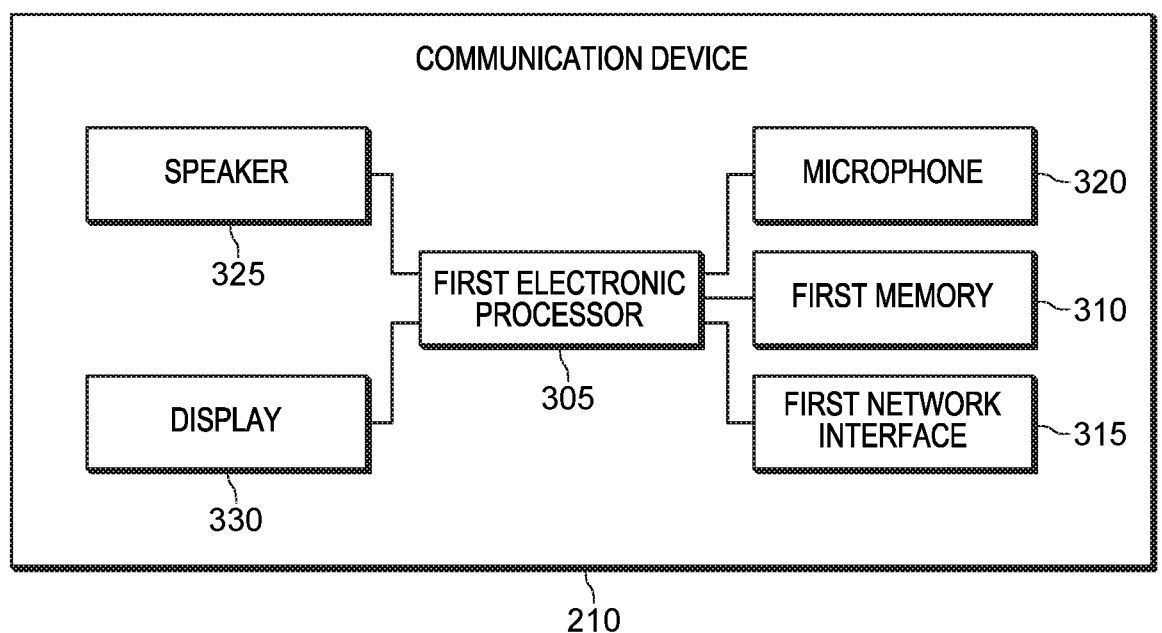
FIG. 3 is a block diagram of a communication device included in the command center of FIG. 2 according to one example embodiment.

FIG. 3 is a block diagram of a communication device 210 according to one example embodiment. In the embodiment illustrated, the communication device 210 includes a first electronic processor 305 (for example, a microprocessor or other electronic device). The first electronic processor 305 includes input and output interfaces (not shown) and is electrically coupled to a first memory 310, a first network interface 315, a microphone 320, a speaker 325, and a display 330. In some embodiments, the communication device 210 includes fewer or additional components in configurations different from that illustrated in FIG. 3. For example, the communication device 210 may additionally include a push-to-talk button or a camera. As another example, the communication device 210 may include one or more additional input devices such as a computer mouse and/or a keyboard that receive inputs from a user of the communication device 210. In some embodiments, the communication device 210 performs functionality other than the functionality described below.

The first memory 310 may include read only memory (ROM), random access memory (RAM), other non-transitory computer-readable media, or a combination thereof. The first electronic processor 305 is configured to receive instructions and data from the first memory 310 and execute, among other things, the instructions. In particular, the first electronic processor 305 executes instructions stored in the first memory 310 to perform the methods described herein. In some embodiments, the first memory 310 is implemented on devices located at the command center 110, at a remote location, or at a remote cloud-computing cluster.

The first network interface 315 sends and receives data to and from the communication device manager 205. In some embodiments, the first network interface 315 additionally or alternatively sends and receives data to and from the network 115 without the data first passing through a separate communication device manager 205. In some embodiments, the first network interface 315 includes one or more transceivers for wirelessly communicating with the communication device manager 205 and/or the network 115. Alternatively or in addition, the first network interface 315 may include a connector or port for receiving a wired connection to the communication device manager 205 and/or the network 115, such as an Ethernet cable. The first electronic processor 305 may receive one or more data feeds (for example, a video feed, an audio feed, an image feed, a text feed, a sensor input data feed, and the like) over the network 115 through the first network interface 315 (for example, data feeds generated by one or more network-connectable devices 105 and transmitted over the network 115). In some embodiments, the first electronic processor 305 receives data feeds through the first network interface 315 directly from a network-connectable device 105. In some embodiments, communication of data feeds may occur in approximately real-time. The first electronic processor 305 may communicate data generated by the communication device 210 over the network 115 through the first network interface 315, such as for receipt by one or more network-connectable devices 105. For example, the first electronic processor 305 receives electrical signals representing sound from the microphone 320 and may communicate information relating to the electrical signals over the network 115 through the first network interface 315 to other devices, for example, to one or more network-connectable devices 105. Similarly, the first electronic processor 305 may output the one or more data feeds received from the network 115 through the first network interface 315, for example from a network-connectable device 105, through the speaker 325, the display 330, or a combination thereof. For example, the communication device 210 engages in a voice call with a network-connectable device 105 over the network 115.

The display 330 displays images, video, text, and/or data from sensor inputs to the user (for example, an incident-handling dispatcher). The display 330 may be a liquid crystal display (LCD) screen or an organic light emitting display (OLED) display screen. In some embodiments, a touch sensitive input interface may be incorporated into the display 330 as well, allowing the user to interact with content provided on the display 330. In some embodiments, the display 330 includes a projector or future-developed display technologies. In some embodiments, the speaker 325 and the display 330 are referred to as output devices that present data feeds to a user of the communication device 210 (for example, an incident-handling dispatcher). In some embodiments, the microphone 320, a computer mouse, and/or a keyboard or a touch-sensitive display are referred to as input devices that receive input from a user of the communication device 210.

In some embodiments, the network-connectable devices 105 include similar components as those shown in FIG. 3 with respect to the communication device 210. In some embodiments, the network-connectable devices 105 include fewer or additional components in configurations different from that illustrated in FIG. 3. For example, a network-connectable device 105 may also include one or more of a push-to-talk button to initiate voice communication over the network 115 (for example, an audio feed), a camera to capture a video feed and/or an image feed to be transmitted over the network 115, and a location component (for example, a global positioning system receiver) configured to determine the geographic coordinates of the location of the network-connectable device 105. In some embodiments, the network-connectable devices 105 transmit their respective location coordinates over the network 115 when transmitting data feeds to the command center 110 (for example, location information is stored as metadata associated with a data feed). Similarly, in some embodiments, the network-connectable devices 105 also include a time stamp when transmitting a data feed such that the command center 110 may determine a time of capture of the data feed or a time of transmission of the data feed. In some embodiments, the network-connectable devices 105 transmit a unique identifier of the network-connectable device 105 over the network 115 when transmitting data feeds to the command center 110 (for example, a unique identifier is stored as metadata associated with a data feed). In some embodiments, the network-connectable devices 105 transmit a text feed over the network 115 to the command center 110 (for example, a text message from a smart phone, portable radio, or the like that includes alphanumeric and/or numeric data).

In some embodiments, a network-connectable device 105 also includes one or more sensors to generate data related to a user of the network-connectable device 105 and/or an environment of the network-connectable device 105. For example, the network-connectable device 105 may include a biometric sensor to monitor biometric data of a user (for example, a citizen, an officer such as a public safety officer, and the like) such as heart rate, breathing rate, body temperature, and the like. As another example, the network-connectable device 105 may include a pedometer, a sensor-enabled holster to detect when a weapon has been removed from the holster, and/or a sensor that detects when the weapon has been discharged. As yet another example, the network-connectable device 105 may include one or more sensors that monitor an environment of the user such as temperature, humidity, air quality, ambient noise level, and the like.

In some embodiments, one or more sensors communicate over the network 115 and may, themselves, be considered network-connectable devices 105. In other embodiments, one or more sensors are separate from a network-connectable device 105, and the separate sensors are not capable of directly communicating over the network 115. In such embodiments, the separate sensors (for example, a sensor-enabled holster) may communicate over the network 115 via a network-connectable device 105 (for example, a nearby smart phone, portable radio, and the like). For example, such separate sensors form a personal area network (PAN) with the network-connectable device 105 via corresponding short-range PAN transceivers, which may be based on a Bluetooth, Zigbee, Bluetooth Low Energy, WiFi, Near Field Communication (NFC), Radio Frequency ID (RFID) or other short-range wireless protocol. In such embodiments, the combination of the network-connectable device 105 and associated separate sensors that communicate monitored data to the network-connectable device 105 may be referred to as a single network-connectable device 105. In some embodiments, the network-connectable devices 105 transmit one or more sensor input data feeds over the network 115 to the command center 110, for example, to be displayed on a communication device 210 of an incident-handling dispatcher. In some embodiments, the network-connectable devices 105 transmit sensor input data feeds to the command center 110 as metadata included in a data feed. In some embodiments, the network-connectable devices 105 perform functionality other than the functionality described above.

Figure 4:
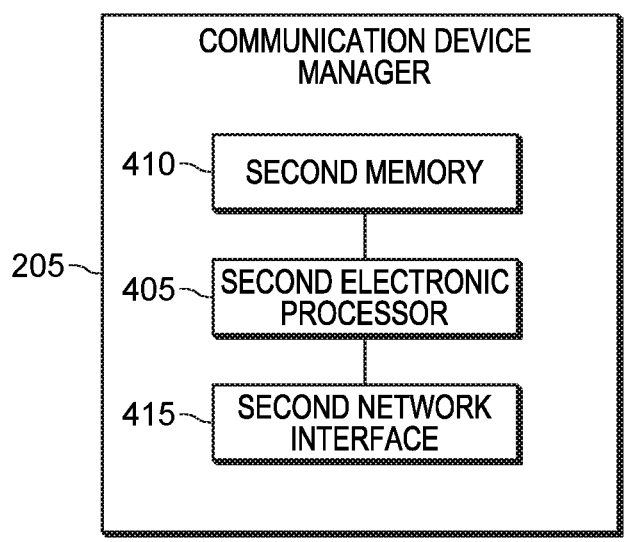
FIG. 4 is a block diagram of a communication device manager included in the command center of FIG. 2 according to one example embodiment.

FIG. 4 is a block diagram of the communication device manager 205 according to one example embodiment. In the example shown, the communication device manager 205 includes a second electronic processor 405 electrically connected to a second memory 410 and a second network interface 415. These components are similar to the like-named components of the communication device 210 explained above with respect to FIG. 3 and function in a similar manner as described above. In some embodiments, the second network interface 415 sends and receives data to and from the network 115 and the communication devices 210. In some embodiments, the communication device manager 205 includes fewer or additional components in configurations different from that illustrated in FIG. 4. For example, the communication device manager 205 may additionally include a display such as a touch screen to allow a user to reprogram settings of the methods described below. In some embodiments, the communication device manager 205 performs functionality other than the functionality described below.

As mentioned above, in some embodiments, the command center 110 further includes initial data feed-receiving devices such as emergency call-taking devices that are integrated with the communication device manager 205 to receive data feeds from the network-connectable devices 105 over the network 115. In other embodiments, the emergency call-taking devices are separate from the communication device manager 205 and are communicatively coupled between the communication device manager 205 and the network 115 to provide data feeds received from the network-connectable devices 105 over the network 115 to the communication device manager 205. In some embodiments, the emergency call-taking devices are communicatively coupled between the communication device manager 205 and the network 115 via wired connections, wireless connections, or a combination thereof.

In some embodiments, the emergency call-taking devices are configured to receive data feeds from network-connectable devices 105 operated by citizens (for example, smart phones of citizens who have entered a user input to transmit one or more data feeds to a public safety command center 110 by, for example, dialing 9-1-1). In some embodiments, each emergency call-taking device is operated by an emergency call-taker (for example, a dispatcher) that may be tasked with identifying a type of incident based on the one or more received data feeds from a network-connectable device 105. For example, the emergency call-taker may enter a user input into the emergency call-taking device to identify an incident type and/or a location of the incident based on a received voice call (for example, an audio feed) where a citizen describes the incident. In some embodiments, the emergency call-taker decides how to respond to the data feed to help the citizen and handle the incident. For example, the emergency call-taking device may receive a user input from the emergency call-taker to transfer the data feed to a different agency (for example, animal control), take no action (for example, when the data feed is a prank call or an accidental call), transfer the data feed to the communication device manager 205 to be further transferred to the communication device 210 of an incident-handling dispatcher, and the like. In the example where the emergency call-taking device transfers the data feed to the communication device manager 205, the emergency call-taking device may also transfer information corresponding to the incident type and the location of the incident that was identified by the emergency call-taker. In some embodiments, the emergency call-taking device also transfers information corresponding to which communication device 210 the data feed should be transmitted. For example, the emergency call-taking device receives a user input from the emergency call-taker to transfer the data feed to the communication device 210A because one or more previously-received data feeds associated with the same incident were routed to the communication device 210A. In this example, the communication device 210A of the same incident-handling dispatcher receives multiple data feeds relating to a single incident in which the incident-handling dispatcher is monitoring and handling. In some embodiments, the emergency call-taker device and/or the communication device manager 205 determine how to respond to the data feed to help the citizen and handle the incident in an automated manner (for example, using one or more of voice analytics, video analytics, text analytics, and the like to take a predetermined action based on the received data feed). For example, the emergency call-taker device, the communication device manager 205, or a combination thereof may analyze metadata of a data feed or use an automated questionnaire to obtain information about a data feed from a user of a network-connectable device 105 as described in further detail below.

While the emergency call-taking devices are configured to receive data feeds from network-connectable devices 105 operated by citizens, in some embodiments, the communication device manager 205 directly receives data feeds from network-connectable devices 105 operated by officers such as public safety officers. For example, because the public safety officers are trained to identify and handle many different public safety incidents, it may not be necessary for an emergency call-taker to identify a type of incident or how to handle the incident when the data feed is received from a network-connectable device 105 of an officer. Rather, the network-connectable device 105 of a public safety officer may receive a user input from the officer indicating a type of incident (for example, by the officer entering a code that represents the incident type) and other information related to the incident (for example, location, number of victims, and the like). The network-connectable device 105 of the officer then transmits this information as well as any selected data feeds over the network 115 to the communication device manager 205 to be transferred to a communication device 210 of the incident-handling dispatcher that is handling the corresponding incident.

In some embodiments, data feeds are received from network-connectable devices 105 that include, for example, sensors and a camera, that are not operated by a citizen or an officer. For example, data feeds may be received from one or more of a security camera, a traffic camera, an alarm notification system that monitors one or more of a building, a park, a fence, a parking lot, and other geographical locations (for example, a fire alarm, a toxic gas alarm, and the like), and the like.

While FIGS. 3 and 4 show separate block diagrams of the communication device 210 and the communication device manager 205, as noted above, in some embodiments, the communication devices 210 and/or the emergency call-taking devices are integrated into the communication device manager 205 and directly controlled by one or more electronic processors of the communication device manager 205. In other embodiments, the functionality of the communication device manager 205 may be integrated into each of the communication devices 210 and/or the emergency call-taking devices. In some embodiments, the communication device manager 205, the communication devices 210, the emergency call-taking devices, and/or a combination thereof are referred to as an electronic computing device that performs the functionality described below. For example, the electronic computing device may be a single electronic processor (for example, the second electronic processor 405 of the communication device manager 205) or a plurality of electronic processors located in the communication device manager 205. In other embodiments, the electronic computing device includes multiple electronic processors distributed across different devices. For example, the electronic computing device is implemented on one or more of the first electronic processors 305 of the communication devices 210, the second electronic processor 405 of the communication device manager 205, and one or more electronic processors located in one or more devices located at the command center 110 (such as emergency call-taking devices), at a remote location, or at a remote cloud-computing cluster. In some embodiments, the electronic computing device is a network-connectable device 105 and an electronic processor of the network-connectable device 105 performs the functionality described below.

As explained above, a dispatch console located at the command center 110 may receive one or more data feeds from citizens (for example, a voice call, a live or recorded video feed, a text message, and the like). The communication device 210 may additionally or alternatively receive one or more data feeds from the officers handling the incident (for example, employees of a theme park; security guards at a concert or sporting event; public safety officers such as police officers, firefighters, and paramedics; and the like). For example, the dispatch console of the incident-handling dispatcher receives a video feed or an image feed from one or more of a dash camera of a vehicle, a body-worn camera of an officer, and a traffic camera. As another example, the dispatch console of the incident-handling dispatcher receives a sensor input data feed from a biometric sensor that monitors biometric data of an officer. In some situations, the dispatch console is configured to receive multiple data feeds simultaneously. For example, the dispatch console (for example, a communication device 210) allows the dispatcher to engage in a voice call using the microphone 320 and the speaker 325 while presenting multiple biometric data sensor feeds and/or location data sensor feeds on the display 330 to be viewed by the dispatcher. As another example, the dispatch console receives multiple voice calls simultaneously and presents options on the display 330 to allow the dispatcher to select which voice call should be made active for communication between the dispatcher and a caller.

However, in some situations, the dispatch console may only allow the dispatcher to participate in a voice call with one other device at a time. This situation may be problematic when multiple callers are calling about the same incident, but the calls are queued due to lack of availability of dispatchers. For example, a second caller whose call is placed in a queue may be able to provide more reliable and/or more relevant information to the dispatcher about the incident but is unable to do so because the dispatcher is unavailable while participating in a voice call with a first caller. Along similar lines, when the second caller is able to communicate with a second dispatcher who becomes available, the second dispatcher does not have the information provided by the first caller because the second dispatcher did not communicate with the first caller. Additionally, in general, information reported by callers may be inaccurate and/or unverified. Furthermore, there may be privacy concerns regarding sharing of private information when multiple callers are able to hear each other when engaging in group communication. Thus, there is a technological problem with respect to the communication between a dispatcher and people reporting incident information to the dispatcher.

Figure 5:
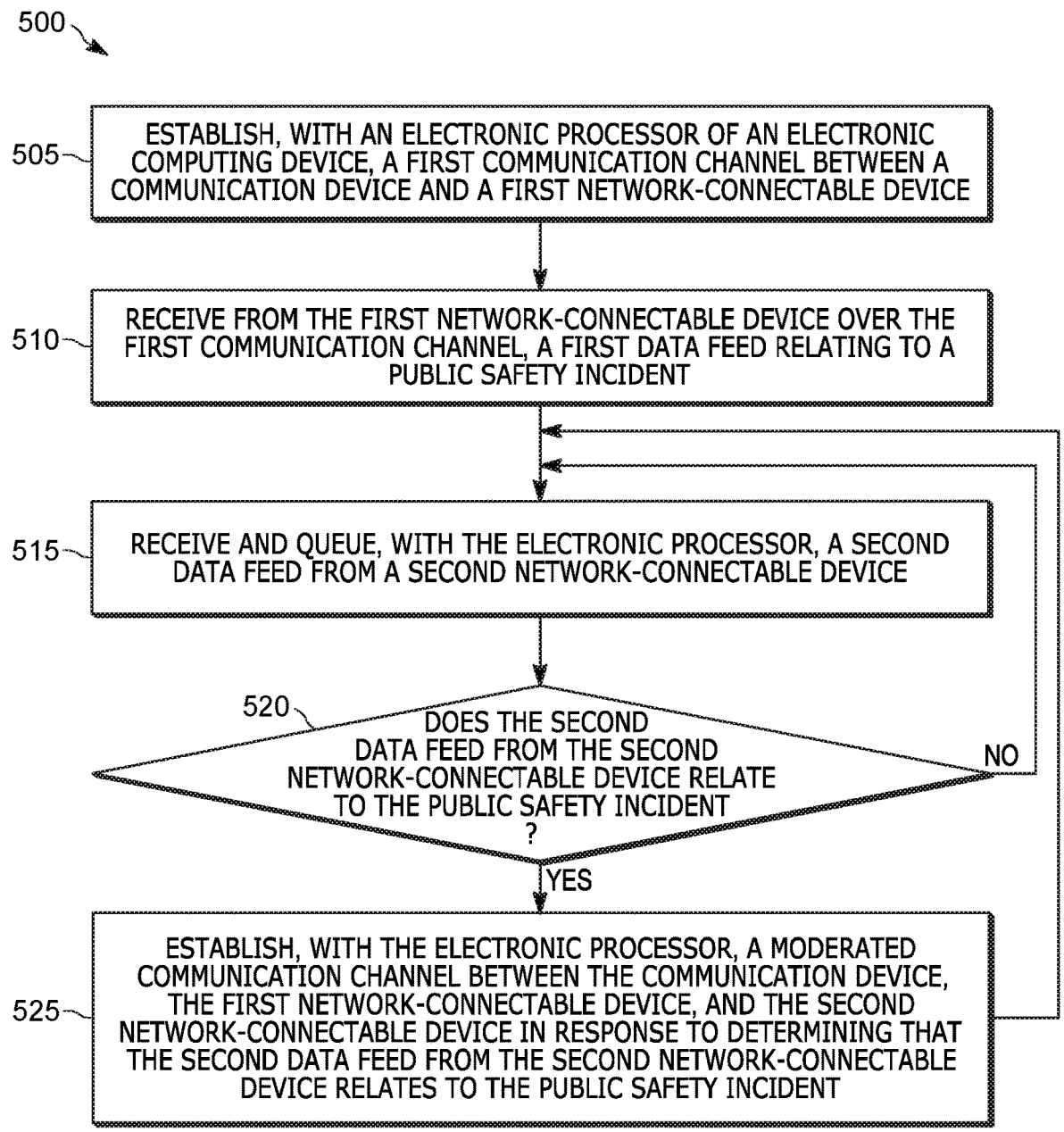
FIG. 5 is a flow chart of a method for establishing a moderated communication channel between three or more of the devices of the communication system of FIG. 1 according to one example embodiment.

To solve this technological problem, the electronic computing device described above performs, in one instance, one or more of the methods explained below. For example, a method 500 of FIG. 5 is executed by the electronic computing device to establish a moderated communication channel between a communication device 210 of a dispatcher (for example, a dispatch console) and a plurality of network-connectable devices 105 of callers (for example, smart telephones, tablets, portable radios, and the like). In some embodiments, before establishing the moderated communication channel, the electronic computing device obtains permission from the first caller and the second caller to communicate over the moderated communication channel. In some embodiments, the electronic computing device identifies private information received from a device of one of the first caller and the second caller over the moderated communication channel and prevents the device of the other of the first caller and the second caller from receiving the private information.

The method 500 solves the above-noted technological problem by improving communication between a dispatcher and people reporting incident information to the dispatcher by determining that multiple callers are calling to provide information about the same incident and establishing a moderated communication channel. For example, using the moderated communication channel, the dispatcher is able to obtain information about the incident from multiple callers without engaging in separate calls. In some situations, one caller may be able to correct an error in information provided by another caller or provide additional information based on information provided by another caller. For example, when a first caller states that a thief was wearing a red shirt, another caller may be able to correct the statement by stating that the shirt of the thief was actually brown. As another example, another caller may be able to provide the name of the thief or provide the make and model of a getaway vehicle used by the thief. Additionally, the method 500 may reduce the size of a queue of callers contacting a public safety agency by more quickly identifying an incident associated with each call and placing calls in the appropriate moderated communication channel of a dispatcher that is handling the incident. Furthermore, due to privacy permissions and settings as mentioned above and described in detail below, the method 500 prevents private information of callers from being provided to other callers over the moderated communication channel. Thus, the method 500 improves the speed and accuracy at which a dispatcher may receive incident information from callers while maintaining a level of privacy between the callers.

FIG. 5 illustrates a flow chart of the method 500 performed by the electronic computing device for establishing a moderated communication channel. While a particular order of processing steps, message receptions, and/or message transmissions is indicated in FIG. 5 as an example, timing and ordering of such steps, receptions, and transmissions may vary where appropriate without negating the purpose and advantages of the examples set forth in detail throughout the remainder of this disclosure.

At block 505, the electronic computing device establishes, with an electronic processor, a first communication channel between a communication device 210 of a dispatcher and a first network-connectable device 105. In some embodiments, the first communication channel is established via one or more network interfaces configured to receive and transmit communications between the communication device 210 and the first network-connectable device 105 (for example, via the first network interface 315, the second network interface 415, a network interface of the first network-connectable device 105, or a combination thereof as described above). In some embodiments, the term "first communication channel" is used to indicate that the communication device 210 and the first network-connectable device 105 may communicate with each other over the network 115. In other words, the first communication channel may be a dedicated communication channel (for example, established using circuit switching) or may be one or more dynamic communication paths utilized during communication using packet switching.

At block 510, the electronic computing device receives a first data feed relating to a public safety incident over the first communication channel from the first network-connectable device 105. For example, the first data feed is an audio feed such as a voice call. As another example, the first data feed is a video feed (for example, a video call), a text feed (for example, one or more text messages), and the like. The electronic computing device may determine that the first data feed relates to a public safety incident in multiple different manners as described above. For example, an incident type of the first data feed is identified by an emergency call-taker and associated with the first data feed via an input of an emergency call-taker device. As another example, metadata included in the first data feed includes location information that indicates a location from where the first data feed was received as the location of a public safety incident. As another example, the electronic computing device uses a natural language processing engine to recognize keywords spoken by a caller during a call (for example, "gas leak," "fire," and the like) to determine that the first data feed relates to a public safety incident. In some embodiments, a communication device 210 of a dispatcher receives the first data feed to allow the dispatcher to communicate with the caller and handle the incident as described above.

At block 515, the electronic computing device receives and queues a second data feed from a second network-connectable device 105. For example, the electronic computing device queues the second data feed when all communication devices 210 of incident-handling dispatchers and emergency call-takers are currently engaged in another call and unavailable to handle the second data feed. The electronic computing device may queue the second data feed in other situations as well.

At block 520, the electronic computing device determines whether the second data feed from the second network-connectable device 105 relates to the same public safety incident as the first data feed from the first network-connectable device 105. In some embodiments, the electronic computing device is configured to determine that the second data feed relates to the same public safety incident as the first data feed based on at least one common data element of the first data feed and the second data feed. For example, the common data element is one or more of common location data, common keyword data, common biometric data, and common profile data.

As an example of using common location data, the electronic computing device determines that the first data feed and the second data feed relate to the same public safety incident based on the locations from which the data feeds were received being within a predetermined distance from each other (for example, within fifty meters, within twenty meters, and the like). As an example of using common keyword data, the electronic computing device determines that the first data feed and the second data feed relate to the same public safety incident based on recognizing common keywords spoken by a caller during a call (for example, "gas leak," "fire," and the like). In other words, the electronic computing device determines that the first and second data feeds both relate to a common incident type by using a natural language processing engine to analyze keywords recognized in each data feed. As an example of using common biometric data, the electronic computing device determines that the first data feed and the second data feed relate to the same public safety incident when biometric data received in the data feeds is similar such as a decrease in heart rate or breathing rate that may indicate a gas leak in a building where both callers are located. As another example of using common biometric data, the electronic computing device determines that the first data feed and the second data feed relate to the same public safety incident when the biometric data received with each data feed (for example, received as metadata) indicates that the users are both running (for example, running away from a dangerous situation).

With respect to common profile data, the electronic computing device determines that the first data feed and the second data feed relate to the same public safety incident based on common characteristics of callers associated with the network-connectable devices 105. As explained above, the data feeds may include metadata that includes an identifier that identifies a user of the network-connectable device 105. Additionally, the electronic computing device may identify a caller using voice recognition techniques or using natural language processing to recognize when the caller states his or her name during the call. Based on the identity of the user, the electronic computing device may be able to retrieve information about the caller such as age, gender, address, job information, social media information, and the like. In some embodiments, the electronic computing device accesses one or more local or remotely-located databases to retrieve such information. In some embodiments, the databases are operated by a third-party. In some embodiments, the electronic computing device uses the common profile data (for example, common characteristics of the users) to determine the first data feed and the second data feed relate to the same public safety incident. For example, when the first and second data feeds are both from callers who work at the same place of employment and both data feeds are received during normal business hours, the electronic computing device may determine that the first data feed and the second data feed relate to the same public safety incident (for example, an incident occurring at the place of employment of the callers). As another example, the electronic computing device determines that the first data feed and the second data feed relate to the same public safety incident when social media information retrieved from a social media database indicates that both callers are attending the same social activity (for example, a concert, a sporting event, and the like).

In some embodiments, one or more common data elements (for example, common location data, common keyword data, common biometric data, common profile data, and the like) are used in combination by the electronic computing device as factors to determine whether the first data feed and the second data feed relate to the same public safety incident. In such embodiments, the electronic computing device may assign each common data element a point value. For example, common location data is worth five points when the locations from which the first and second data feeds were received are within a first predetermined distance (for example, one hundred meters). Continuing this example, common location data is worth ten points when the locations from which the first and second data feeds were received are within a second predetermined distance (for example, twenty-five meters). As another example, each common keyword that indicates incident type that is included in the data feeds is worth five points, and each common characteristic included in profile data of the data feeds is worth three points. In some embodiments, the electronic computing device determines that the first data feed and the second data feed relate to the same public safety incident in response to determining that a common data element score is above a predetermined threshold (for example, ten points, twenty points, and the like). In some embodiments, the point values and the thresholds described above are user configurable via an input device of the electronic computing device at the command center 110. In other words, the electronic computing device may be programmed to use one or more common data elements when determining whether the first data feed and the second data feed relate to the same public safety incident. The example point values and thresholds described above are merely examples and other point values and thresholds may be used.

In some embodiments, the electronic computing device is configured to determine that the first data feed and the second data feed relate to the same public safety incident by providing an automated questionnaire to the queued second network-connectable device 105. In some embodiments, the electronic computing device is configured to include questions in the automated questionnaire based on at least one common data element of the first data feed and the second data feed. For example, the common data element is one or more of common location data, common keyword data, common biometric data, and common profile data as explained above. As one example, based on the location from which the queued second data feed was received (for example, known by analyzing metadata of the second data feed), the electronic computing device transmits a message to cause the second network-connectable device 105 to audibly output "there are currently two incidents near your location. Press one if you are calling regarding the robbery on 123 Main Street. Press two if you are calling regarding the fire on 100 Main Street. Press three if you are not calling about the previously-described incidents." In addition to or as an alternative to receiving responses to the automated questionnaire via user input of a caller on a keypad or touchscreen, the electronic computing device receives oral responses from the caller and uses a natural language processing engine to determine whether the caller is calling regarding one of the known incidents. As another example of providing an automated questionnaire, when the second data feed does not include metadata, the electronic computing device controls the automated questionnaire to attempt to obtain general data elements of the second data feed such that the electronic computing device may be able to ask more specific questions based on the responses to the initial general questions. For example, the automated questionnaire may ask the caller for his or her name or location. In response to receiving such information, the electronic computing device provides more specific questions in the automated questionnaire such as asking about known incidents near the location of the caller as described in the above example.

In some embodiments, the electronic computing device is configured to provide the automated questionnaire to the second network-connectable device 105 in response to determining at least one of the group consisting of that a quantity of incidents exceeds a predetermined incident quantity threshold, that a quantity of data feeds exceeds a predetermined data feed quantity threshold, that a quantity of data feeds in a data feed queue exceeds a data feed queue threshold, and that an incident severity level exceeds an incident severity level threshold. For example, when the quantity of active incidents being handled by dispatchers at the command center 110 exceeds a predetermined incident quantity threshold, the electronic computing device provides the automated questionnaire to one or more network-connectable devices 105 in the queue (for example, the second network-connectable device 105). As another example, when a quantity of data feeds received by the command center 110 (for example, an overall quantity of queued data feeds and data feeds being actively handled by dispatchers) exceeds a predetermined data feed quantity threshold, the electronic computing device provides the automated questionnaire to one or more network-connectable devices 105 in the queue. Similarly, as another example, the electronic computing device provides the automated questionnaire to one or more network-connectable devices 105 in the queue in response to determining that a quantity of data feeds in the queue exceeds a data feed queue threshold.

While an incident is being actively handled by a dispatcher, the electronic computing device may determine an incident severity level for the incident being handled. In some embodiments, the incident severity level is based on one or more of incident type of the incident, location of the incident, and other characteristics of the incident. For example, the electronic computing device determines that a fire at an abandoned barn has a lower severity level than a bomb threat at a school. In some embodiments, the electronic computing device categorizes incident severity for an incident into different levels such as low, medium, and high or one through ten with ten being most severe. In some embodiments, the electronic computing device provides the automated questionnaire to one or more network-connectable devices 105 in the queue in response to determining that an incident severity level of an incident exceeds a severity level threshold. For example, when the electronic computing device determines that an active incident such as a bomb threat at a school has a severity level that exceeds the severity level threshold, the electronic computing device provides an automated questionnaire to the network-connectable devices 105 in the queue asking "are you calling about the incident at Main Street School?". Accordingly, based on the responses to this automated questionnaire, the electronic computing device is able to identify which data feeds in the queue may provide additional information with respect to the high severity incident at the school.

In response to providing the automated questionnaire, the electronic computing device receives information from the caller associated with the queued second network-connectable device 105. In some embodiments, the electronic computing device then compares the received information to information related to a public safety incident associated with the first data feed to determine whether there are any common data elements included in the received information from the second data feed and the information related to the public safety incident associated with the first data feed. In other words, the electronic computing device determines whether the second data feed relates to a public safety incident associated with the first data feed that is already being provided to an incident-handling dispatcher via a communication device 210. In some embodiments, the electronic computing device uses one or more of the example factors and the example common data element scoring system explained above to make such a determination.

In some embodiments, the information related to the public safety incident associated with the first data feed is location data, incident type data, keyword data, biometric data, and profile data as explained above. In some embodiments, such information from the first data feed is determined by the electronic computing device by using a natural language processing engine to analyze communications of the first data feed between the first caller and the dispatcher over the first communication channel. In some embodiments, the information from the first data feed is determined by the electronic computing device receiving user inputs from an incident-handling dispatcher and/or an emergency call-taker that entered information about the first data feed on a respective communication device 210. In some embodiments, the information from the first data feed is determined by the electronic computing device receiving responses to the automated questionnaire explained above (for example, when the first data feed was previously in the queue and the first network-connectable device 105 previously received the automated questionnaire). In some embodiments, the information from the first data feed is determined by the electronic computing device analyzing metadata of the first data feed as described above.

When the electronic computing device determines that the second data feed does not relate to the public safety incident associated with the first data feed (in other words, that the first data feed and the second data feed do not relate to the same public safety incident) (at block 520), the method 500 proceeds back to block 515 to repeat blocks 515 and 520 with respect to additional received and queued data feeds (for example, a third data feed, a fourth data feed, and so on). When the electronic computing device determines that the second data feed relates to the public safety incident associated with the first data feed (in other words, that the first data feed and the second data feed relate to the same public safety incident) (at block 520), the method 500 proceeds to block 525.

At block 525, the electronic computing device establishes a moderated communication channel between the communication device 210, the first network-connectable device 105, and the second network-connectable device 105 in response to determining that the second data feed from the second network-connectable device 105 relates to the public safety incident associated with the first network-connectable device 105. In some embodiments, the electronic computing device establishes the moderated communication channel by configuring the second network-connectable device 105 to communicate over the first communication channel between the communication device 210 and the first network-connectable device 105. In other embodiments, the electronic computing device establishes the moderated communication channel by establishing a new group communication channel over which the communication device 210 and the first and second network-connectable devices 105 may communicate with each other. Similar to the first communication channel as explained above, the moderated communication channel may be a dedicated communication channel (for example, established using circuit switching) or may be one or more dynamic communication paths utilized during communication using packet switching. After the electronic computing device executes block 525, the method 500 proceeds back to block 515 to repeat blocks 515, 520, and 525 as appropriate with respect to additional received and queued data feeds (for example, a third data feed, a fourth data feed, and so on).

In some embodiments, before establishing the moderated communication channel, the electronic computing device obtains permission from a second caller associated with the second network-connectable device 105, a first caller associated with the first network-connectable device 105, or both. In some embodiments, the electronic computing device receives an input indicating that permission for the second network-connectable device 105 to communicate over the moderated communication channel has been granted. For example, when the electronic computing device receives a response to the above-explained automated questionnaire indicating that the second data feed relates to a public safety incident associated with the first data feed that is being actively handled by a dispatcher, the electronic computing device attempts to obtain permission from the second caller to merge the second data feed onto the moderated communication channel with the first data feed. For example, the electronic computing device transmits a message to cause the second network-connectable device 105 to audibly output a message, for example, "would you like to join a group call already in progress regarding the incident?". The electronic computing device may receive an input from the second caller (for example, an input indicative of a button pressing or touchscreen input by the second caller or a voice response by the second caller) granting permission for the electronic computing device to create a moderated communication channel that includes the second data feed from the second network-connectable device 105. In some embodiments, the electronic computing device receives a user input from an emergency call-taker initially handling the second data feed indicating that the second caller granted permission to be included in the moderated communication channel. In response to receiving the input indicating that permission for the second network-connectable device 105 to communicate over the moderated communication channel has been granted, the electronic computing device establishes the moderated communication channel between the communication device 210, the first network-connectable device 105, and the second network-connectable device 105.

In some embodiments, before establishing the moderated communication channel, the electronic computing device also obtains permission from first caller associated with the first network-connectable device 105 that is already engaged in an active call with a dispatcher. For example, when the electronic computing device has determined to merge the second data feed with the first data feed that is actively being handled, the electronic computing device presents a notification on the display 330 of the communication device 210 of the dispatcher handling the first data feed. The notification indicates that another data feed (for example, the second data feed) is available to be merged onto a moderated communication channel. In response to viewing the notification, the dispatcher may manually ask the first caller for permission to merge the first data feed with the second data feed on the moderated communication channel. When the first caller grants permission to do so, the electronic computing device may receive a user input from the dispatcher indicating that the first caller granted permission. Alternatively, the electronic computing device may use a natural language processing engine to monitor communications between the dispatcher and the first caller to recognize that the dispatcher asked for permission and that the first caller granted permission. In some embodiments, the electronic computing device may automatically attempt to obtain permission from the first caller instead of notifying the dispatcher to attempt to manually obtain permission. For example, the electronic computing device may interrupt communications between the first caller and the dispatcher over the first communication channel to ask the first caller for permission in a similar manner as the automated questionnaire obtains information from the second caller. In some embodiments, the electronic computing device automatically attempts to obtain permission from the first caller in other manners such as by transmitting a text message that the first caller may respond to orally during a voice call, via text message, or by pressing buttons or a touch screen interface on the first network-connectable device 105.

Turning to other features of the moderated communication channel, in some embodiments, the electronic computing device moderates the moderated communication channel to prevent callers from hearing each other, to prevent the dispatcher from hearing one or more callers, or a combination thereof. The electronic computing device may moderate the moderated communication channel automatically, in response to user input received via an input device of the communication device 210 from the dispatcher (in other words, manually), or as a combination thereof.

With respect to moderating the moderated communication channel manually, the electronic computing device receives an input from the communication device 210 of the dispatcher indicating that one of the first data feed and the second data feed should be moderated. In response to receiving this input from the communication device 210, the electronic computing device prevents at least one of the communication device 210 and one of the second network-connectable device 105 and the first network-connectable device 105 from receiving the respective one of the first data feed and the second data feed. For example, the dispatcher selects the second data feed (for example, via a touchscreen input of the display 330) to engage in a temporary private call with the second caller where the first caller will be muted and will be unable to hear the communication between the dispatcher and the second caller. As another example, the dispatcher selects the first data feed to prevent the first caller from hearing private information of the second caller. For example, when the dispatcher asks the second caller for his or her address, the dispatcher manually moderates the first data feed to prevent the first caller from hearing the address of the second caller. In this example, the dispatcher and/or the second caller may still be able to hear the first caller. In summary, the dispatcher may manually moderate the moderated communication channel to prevent other callers from hearing each other or to engage in a temporary private communication with one or more callers.

With respect to moderating the moderated communication channel automatically, the electronic computing device analyzes communication occurring over the moderated communication channel using, for example, a natural language processing engine and/or text recognition techniques. In doing so, the electronic computing device identifies private information received from one of the first network-connectable device 105 and the second network-connectable device 105. In some embodiments, the electronic computing device then prevents the other of the one of the first network-connectable device 105 and the second network-connectable device 105 from receiving the private information. In other words, the electronic computing device redacts private information provided by one caller such that other callers may not receive the private information while still allowing the communication device 210 of the dispatcher to receive the private information.

In some embodiments, private information is personal information of a caller such as first name, last name, address, place of employment, medical information, and the like. In some embodiments, the automated questionnaire explained above may include questions relating to preferences of the second caller regarding types of information that may be shared or redacted during communication over the moderated communication channel. For example, after the electronic computing device receives permission from the second caller to merge the second data feed onto the moderated communication channel, the electronic computing device prompts the second caller for preferences regarding types of information that may be shared or redacted during the communication over the moderated communication channel. For example, the electronic computing transmits a message to cause the second network-connectable device 105 to audibly output, for example, "press 1 to remain anonymous during the group call. Press 2 to allow your first name to be used during the group while other personal information, such as your address, will be redacted. Press 3 if you consent to personal information such as your name and address being provided to other callers during the group call." This audible output is merely one example and other privacy preference options may be audibly output by the second network-connectable device 105. As explained above with respect to the automated questionnaire, in addition to or as an alternative to receiving responses to the privacy preferences prompt via user input of a caller on a keypad or touchscreen, the electronic computing device receives oral responses from the caller and uses a natural language processing engine to determine privacy preferences of the caller during the group communication over the moderated communication channel.

In some embodiments, the electronic computing device identifies private information by analyzing keywords and conversation structure during communication between callers and the dispatcher over the moderated communication channel. For example, when the electronic computing device recognizes that the dispatcher has asked a question to the first caller that may prompt a response that provides private information (for example, asking for the name or address of the first caller), the electronic computing device prevents the second network-connectable device 105 of the second caller from receiving information from the first network-connectable device 105 until the first caller has stopped providing private information. In this situation, the electronic computing device moderates the moderated communication channel such that the communication device 210 of the dispatcher still receives the private information from the first network-connectable device 105. In other words, the private information of the first caller is redacted from being heard by the second caller (and any other additional caller on the moderated communication channel) but still may be heard by the dispatcher. As another example of identifying private information, the electronic computing device recognizes phrases spoken by the callers and may redact information provided after such phrases from being heard by other network connectable-devices 105. For example, depending on privacy preferences of a caller as described above, the electronic computing device redacts words spoken after the phrase "my address is" or "my name is" until the caller has stopped providing private information.

In some embodiments, the electronic computing device is configured to identify private information based on at least at least one of the group consisting of an incident type of the public safety incident, an incident severity level of the public safety incident, and identification of predetermined private keywords. In other words, the electronic computing device may determine that information is private information that should be redacted in some situations but may also determine that similar information is not private information and is not redacted in other situations. For example, information provided by a caller regarding a location of one or more firefighters at a fire may not be redacted by the electronic computing device. However, information provided by a caller regarding a location of one or more SWAT team members in a hostage situation may be redacted. With respect to these two examples, the electronic computing device may identify the location of the SWAT team members as private information that should be redacted because of the difference in the incident type of the two public safety incidents. In other words, different keywords may be identified by the electronic computing device as private information for fires than for hostage situations. Along similar lines, information provided by a caller regarding a location of one or more firefighters at a minor, residential fire may not be redacted by the electronic computing device. However, information provided by a caller regarding a location of one or more firefighters at a larger fire at a business building may be redacted. With respect to these two examples, the electronic computing device may identify the location of the firefighters at the large fire as private information that should be redacted because of the difference in the incident severity level of the two public safety incidents. In other words, similar to the previous examples, different keywords may be identified as private information for incidents with a high incident severity level than for incidents with a lower incident severity level.

In some embodiments, the privacy settings explained above that allow the electronic computing device to identify private information being communicated over the moderated communication channel are user-configurable at the command center 110. For example, in addition to or as an alternative to the privacy preferences being selected by a caller as explained above, the privacy preferences and/or the prompt regarding the privacy preferences are user-configurable at the command center 110 via an input device of the electronic computing device. In some embodiments, the electronic computing device is configured to update the privacy settings using machine learning techniques that take into account historical information associated with previous incidents. For example, using machine learning techniques, the electronic computing device determines that revealing a name of an officer and/or a caller may compromise their safety, for example, when an incident is a gang-related incident and a gang member may be able to identify an officer and/or caller acting against the interests of the gang. For this reason, when the incident is a gang-related incident, the electronic computing device may redact names of officers and/or callers when the electronic computing device determines that such names are being communicated over the moderated communication channel. In some embodiments, the electronic computing device is configured to update the privacy settings based on information that has been historically manually redacted in previous communications. For example, the electronic computing device uses machine learning techniques to update keywords and/or conversation structure that indicate private information based on manually redacted information in previous communications. For example, the electronic computing device determines that officer and caller names have been manually redacted, for example by a dispatcher, for previous gang-related incidents in which a moderated communication channel was used. Accordingly, the electronic computing updates stored privacy settings such that the electronic computing device redacts the names of officers and/or callers that are communicated over the moderated communication channel for future gang-related incidents (in other words, based on the incident type being determined to be a gang-related incident).

In some embodiments, the electronic computing device prevents one or more network-connectable devices 105 from receiving private information from other network-connectable devices 105 by establishing parallel sub-channels within the moderated communication channel. For example, parallel sub-channels between network-connectable devices 105 are controlled to be on a time delay (for example, a one second delay) to allow the electronic computing device to identify and determine whether to redact private information. Continuing this example, the sub-channels between a network-connectable device 105 and the communication device 210 of the dispatcher may be controlled not to have the time delay because the electronic computing device does not prevent the dispatcher from receiving the private information in some embodiments. As illustrated by this example, the electronic computing device may implement different time delays for different sub-channels of the moderated communication channel.

In some situations, two different dispatchers operating two different communication devices 210 may be handling different data feeds that both relate to the same public safety incident. For example, the electronic computing device at the command center 110 receives a third data feed and determines that a dispatcher is available. In this situation, the third data feed may not be queued because a dispatcher is available to handle the data feed. In some embodiments, the electronic computing device establishes a second communication channel between a second communication device 210 of a second dispatcher and a third network-connectable device 105 that is providing the third data feed. Accordingly, the second communication device 210 receives the third data feed over the second communication channel from the third network-connectable device 105. In some embodiments, the second communication channel is similar to the first communication channel described above. In the process of handling of the third data feed, the second dispatcher may realize that the incident associated with the third data feed is the same as the incident being handled by the first dispatcher with respect to the first and second data feeds. Accordingly, the second communication device 210 of the second dispatcher may receive an input from the second dispatcher indicating that the third data feed relates to the first public safety incident being handled by the first dispatcher on a first communication device 210. In response to receiving the input from the second communication device 210 of the second dispatcher, the electronic computing device transfers the third data feed to be included in the moderated communication channel. Before this transferring occurs, the electronic computing device may obtain permission from the third caller as described above with respect to the first and second callers.

Figure 6A:
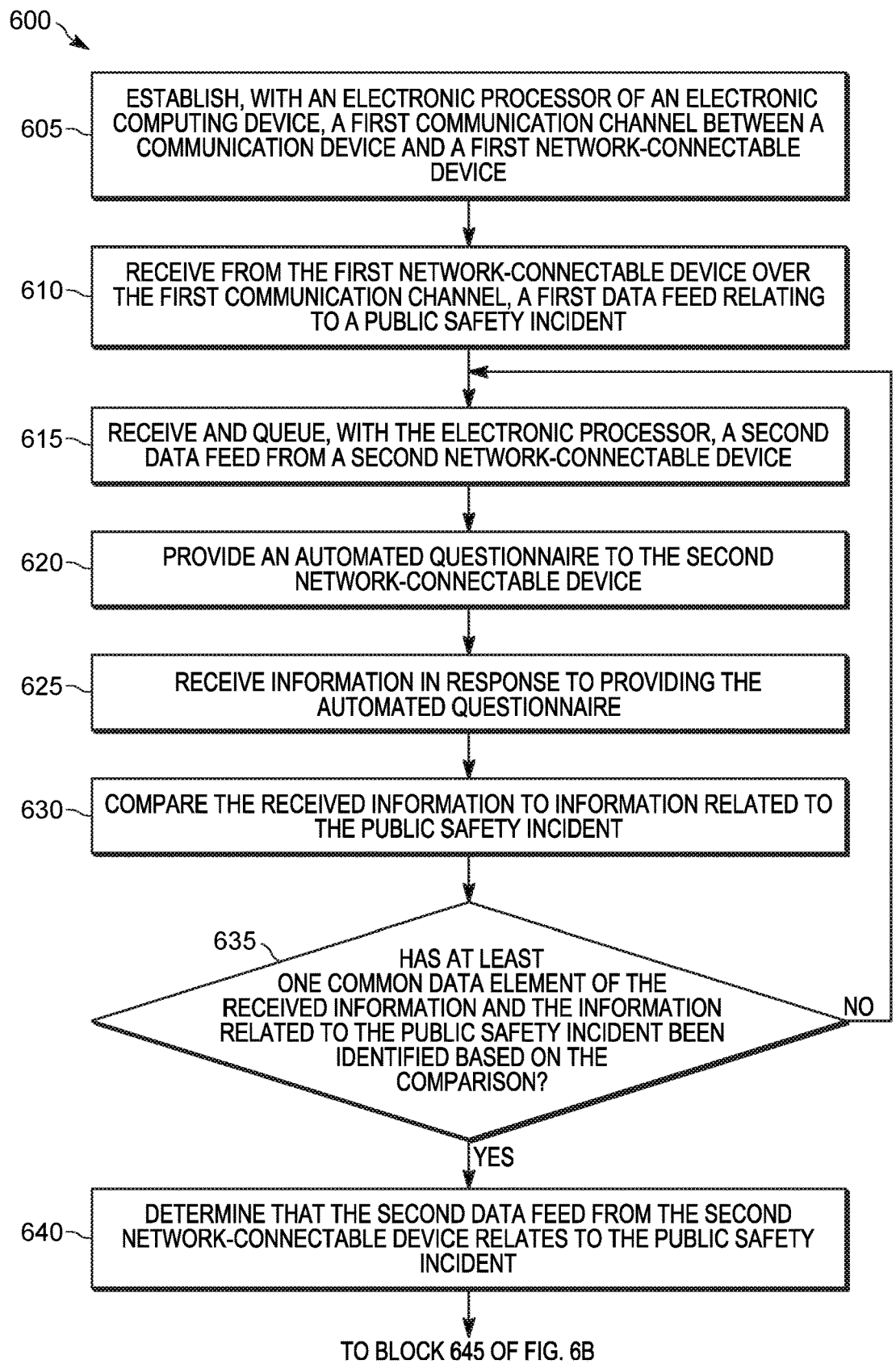
FIGS. 6A and 6B illustrate a flow chart of a method for establishing a moderated communication channel between three or more of the devices of the communication system of FIG. 1 according to another example embodiment.
Figure 6B:
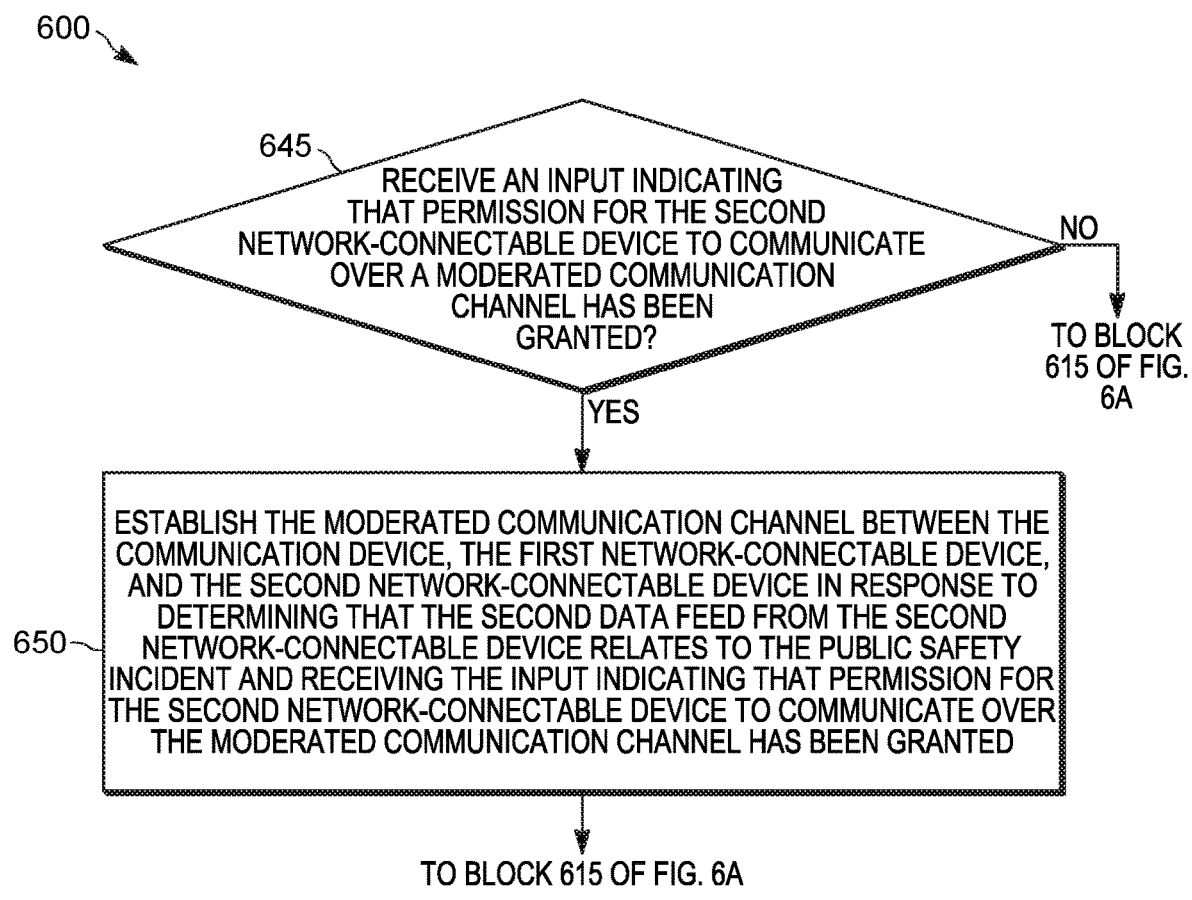

FIGS. 6A and 6B illustrate a flow chart of an example method 600 performed by the electronic computing device for establishing a moderated communication channel. The method 600 is similar to the method 500 but includes some additional blocks in accordance with some of the embodiments described above with respect to the method 500. While a particular order of processing steps, message receptions, and/or message transmissions is indicated in FIGS. 6A and 6B as an example, timing and ordering of such steps, receptions, and transmissions may vary where appropriate without negating the purpose and advantages of the examples set forth in detail throughout the remainder of this disclosure.

At block 605, the electronic computing device establishes a first communication channel between a communication device 210 of a dispatcher and a first network-connectable device 105 as described above with respect to block 505 of FIG. 5. At block 610, the electronic computing device receives a first data feed relating to a public safety incident from the first network-connectable device 105 over the first communication channel as described above with respect to block 510 of FIG. 5. At block 615, the electronic computing device receives and queues a second data feed from a second network-connectable device 105 as described above with respect to block 515 of FIG. 5.

At block 620, the electronic computing device provides an automated questionnaire to the second network-connectable device 105 in the queue as described above with respect to block 520 of FIG. 5. At block 625, the electronic computing device receives information from the second network-connectable device 105 in response to providing the automated questionnaire as described above with respect to block 520 of FIG. 5. At block 630, the electronic computing device compares the received information from the second network-connectable device 105 to information related to the public safety incident associated with the first data feed as described above with respect to block 520 of FIG. 5. At block 635, the electronic computing device determines whether at least one common data element of the received information and the information related to the public safety incident has been identified by the electronic computing device based on the comparison at block 630 as described above with respect to block 520 of FIG. 5. In some embodiments, the common data element is at least one of common location data, common keyword data, common biometric data, and common profile data as described above with respect to block 520 of FIG. 5.

When the electronic computing device does not identify at least one common data element of the received information and the information related to the public safety incident based on the comparison at block 630, the method 600 proceeds back to block 615 to repeat a portion of the method 600 with respect to additional received and queued data feeds as described above with respect to block 520 (for example, a third data feed, a fourth data feed, and so on). When the electronic computing device identifies at least one common data element of the received information and the information related to the public safety incident, at block 640, the electronic computing device determines that the second data feed from the second network-connectable device relates to the public safety incident as described above with respect to block 520.

At block 645, the electronic computing device determines whether an input has been received from the second network-connectable device 105 indicating that permission for the second network-connectable device 105 to communicate over a moderated communication channel has been granted as described above with respect to block 525 of FIG. 5. For example, the electronic computing device includes a request for permission in the automated questionnaire as described above. When such an input has not been received after a predetermined period of time or when an input is received indicating a denial of permission, the method 600 proceeds back to block 615 to repeat a portion of the method 600 with respect to additional received and queued data feeds as described above with respect to block 520 (for example, a third data feed, a fourth data feed, and so on). In some embodiments, the method 600 may proceed back to block 615 before the predetermined period of time has elapsed but may still allow the second caller to grant permission within the predetermined period of time.

When an input has been received from the second network-connectable device 105 indicating that permission for the second network-connectable device 105 to communicate over a moderated communication channel has been granted, at block 650, the electronic computing device establishes the moderated communication channel between the communication device 210, the first network-connectable device 105, and the second network-connectable device 105 as described above with respect to block 525 of FIG. 5. At block 650, the electronic computing device establishes the moderated communication channel in response to determining that the second data feed from the second network-connectable device 105 relates to the public safety incident and in response to receiving the input indicating that permission for the second network-connectable device 105 to communicate over the moderated communication channel has been granted as described above with respect to FIG. 5. After the electronic computing device executes block 650, the method 600 proceeds back to block 615 to repeat a portion of the method 600 as appropriate with respect to additional received and queued data feeds as described above with respect to block 525 (for example, a third data feed, a fourth data feed, and so on).

Although most of the above-described examples refer to a first data feed of a first network-connectable device 105 and a second data feed of a second network-connectable device 105, in some embodiments, the electronic computing device queues and analyzes additional data feeds in accordance with the methods described above. Additionally, the electronic computing device may combine more than two data feeds onto the moderated communication channel. For example, over the moderated communication channel, the communication device 210 of a dispatcher communicates with two, three, four, or more network-connectable devices 105 providing data feeds. Furthermore, although most of the above-described examples refer to the data feeds as audio feeds such as voice calls, in some embodiments, the data feeds include one or more of a video feed, a text feed, an image feed, and a sensor input data feed.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic computing device comprising:
a network interface configured to receive and transmit communications between a communication device and a plurality of network-connectable devices; and
an electronic processor configured to:
establish a first communication channel between the communication device and a first network-connectable device,
receive, from the first network-connectable device over the first communication channel, a first data feed relating to a public safety incident,
receive and queue a second data feed from a second network-connectable device,
determine that the second data feed from the second network-connectable device relates to the public safety incident by
providing an automated questionnaire to the second network-connectable device in response to determining at least one of the group consisting of that a quantity of incidents exceeds a predetermined incident quantity threshold, that a quantity of data feeds exceeds a predetermined data feed quantity threshold, that a quantity of data feeds in a data feed queue exceeds a data feed queue threshold, and that an incident severity level exceeds an incident severity level threshold,
receiving information in response to providing the automated questionnaire, and
comparing the received information to information related to the public safety incident, and
establish a moderated communication channel between the communication device, the first network-connectable device, and the second network-connectable device in response to determining that the second data feed from the second network-connectable device relates to the public safety incident.

2. The electronic computing device of claim 1, wherein the electronic processor is configured to:
receive an input indicating that permission for the second network-connectable device to communicate over the moderated communication channel has been granted; and
establish the moderated communication channel between the communication device, the first network-connectable device, and the second network-connectable device in response to receiving the input indicating that permission for the second network-connectable device to communicate over the moderated communication channel has been granted.

3. The electronic computing device of claim 1, wherein the electronic processor is configured to determine that the second data feed from the second network-connectable device relates to the public safety incident based on at least one common data element of the first data feed and the second data feed, wherein the common data element is at least one of common location data, common keyword data, common biometric data, and common profile data.

4. The electronic computing device of claim 1, wherein the electronic processor is configured to include a question in the automated questionnaire based on at least one common data element of the first data feed and the second data feed, wherein the common data element is at least one of common location data, common keyword data, common biometric data, and common profile data.

5. The electronic computing device of claim 1, wherein the electronic processor is configured to:
identify private information received from one of the first network-connectable device and the second network-connectable device; and
prevent the other of the one of the first network-connectable device and the second network-connectable device from receiving the private information.

6. The electronic computing device of claim 5, wherein the electronic processor is configured to identify the private information based on at least one of the group consisting of an incident type of the public safety incident, an incident severity level of the public safety incident, and identification of predetermined private keywords.

7. The electronic computing device of claim 1, wherein the electronic processor is configured to:
   receive an input from the communication device indicating that one of the first data feed and the second data feed should be moderated; and
   prevent at least one of the communication device and one of the second network-connectable device and the first network-connectable device from receiving the respective one of the first data feed and the second data feed in response to receiving the input from the communication device.

8. The electronic computing device of claim 1, wherein the communication device is a first communication device and the electronic processor is configured to:
   establish a second communication channel between a second communication device and a third network-connectable device over which a third data feed is received by the second communication device from the third network-connectable device; and
   transfer the third data feed to be included in the moderated communication channel in response to receiving an input from the second communication device, wherein the input indicates that the third data feed relates to the public safety incident.

9. The electronic computing device of claim 1, wherein the first data feed and the second data feed include at least one of the group consisting of a video feed, an audio feed, a text feed, and an image feed.

10. A method of establishing a moderated communication channel, the method comprising:
    establishing, with an electronic processor of an electronic computing device, a first communication channel between a communication device and a first network-connectable device;
    receiving, from the first network-connectable device over the first communication channel, a first data feed relating to a public safety incident;
    receiving and queuing, with the electronic processor, a second data feed from a second network-connectable device;
    determining, with the electronic processor, that the second data feed from the second network-connectable device relates to the public safety incident by
       providing, with the electronic processor, an automated questionnaire to the second network-connectable device in response to determining at least one of the group consisting of that a quantity of incidents exceeds a predetermined incident quantity threshold, that a quantity of data feeds exceeds a predetermined data feed quantity threshold, that a quantity of data feeds in a data feed queue exceeds a data feed queue threshold, and that an incident severity level exceeds an incident severity level threshold,
       receiving, with the electronic processor, information in response to providing the automated questionnaire, and
       comparing, with the electronic processor, the received information to information related to the public safety incident; and
    establishing, with the electronic processor, the moderated communication channel between the communication device, the first network-connectable device, and the second network-connectable device in response to determining that the second data feed from the second network-connectable device relates to the public safety incident.

11. The method of claim 10, further comprising:
    receiving, with the electronic processor, an input indicating that permission for the second network-connectable device to communicate over the moderated communication channel has been granted; and
    establishing, with the electronic processor, the moderated communication channel between the communication device, the first network-connectable device, and the second network-connectable device in response to receiving the input indicating that permission for the second network-connectable device to communicate over the moderated communication channel has been granted.

12. The method of claim 10, further comprising determining, with the electronic processor, that the second data feed from the second network-connectable device relates to the public safety incident based on at least one common data element of the first data feed and the second data feed, wherein the common data element is at least one of common location data, common keyword data, common biometric data, and common profile data.

13. The method of claim 10,
    wherein the automated questionnaire includes a question based on at least one common data element of the first data feed and the second data feed, wherein the common data element is at least one of common location data, common keyword data, common biometric data, and common profile data.

14. The method of claim 10, further comprising:
    identifying, with the electronic processor, private information received from one of the first network-connectable device and the second network-connectable device; and
    preventing, with the electronic processor, the other of the one of the first network-connectable device and the second network-connectable device from receiving the private information.

15. The method of claim 14, further comprising identifying, with the electronic processor, the private information based on at least one of the group consisting of an incident type of the public safety incident, an incident severity level of the public safety incident, and identification of predetermined private keywords.

16. The method of claim 10, further comprising:
    receiving, with the electronic processor, an input from the communication device indicating that one of the first data feed and the second data feed should be moderated; and
    preventing, with the electronic processor, at least one of the communication device and one of the second network-connectable device and the first network-connectable device from receiving the respective one of the first data feed and the second data feed in response to receiving the input from the communication device.

17. The method of claim 10, wherein the communication device is a first communication device and further comprising:
    establishing, with the electronic processor, a second communication channel between a second communication device and a third network-connectable device over which a third data feed is received by the second communication device from the third network-connectable device; and
    transferring, with the electronic processor, the third data feed to be included in the moderated communication channel in response to receiving an input from the second communication device, wherein the input indicates that the third data feed relates to the public safety incident.

18. An electronic computing device comprising:
a network interface configured to receive and transmit communications between a communication device and a plurality of network-connectable devices; and
an electronic processor configured to:
  establish a first communication channel between the communication device and a first network-connectable device,
  receive, from the first network-connectable device, a first data feed relating to a public safety incident,
  receive and queue a second data feed from a second network-connectable device,
  provide an automated questionnaire to the second network-connectable device,
  receive information in response to providing the automated questionnaire,
  compare the received information to information related to the public safety incident,
  determine that the second data feed from the second network-connectable device relates to the public safety incident in response to identifying at least one common data element of the received information and the information related to the public safety incident based on comparing the received information to the information related to the public safety incident, wherein the common data element is at least one of common biometric data and common profile data retrieved from a social media database,
  receive an input indicating that permission for the second network-connectable device to communicate in a real-time group communication over a moderated communication channel has been granted, wherein each of the communication device, the first network-connectable device, and the second network-connectable device is configured to receive information from and transmit information to each other over the moderated communication channel during the real-time group communication, and
  establish the moderated communication channel for the real-time group communication between the communication device, the first network-connectable device, and the second network-connectable device in response to
    determining that the second data feed from the second network-connectable device relates to the public safety incident, and
    receiving the input indicating that permission for the second network-connectable device to communicate in the real-time group communication over the moderated communication channel has been granted.

* * * * *